United States Patent [19]

Borkowicz et al.

[11] Patent Number: 4,977,532

[45] Date of Patent: Dec. 11, 1990

[54] INDUSTRIAL COMPUTER SYSTEM WITH REMOVABLE EQUIPMENT DRAWER

[75] Inventors: Neil L. Borkowicz, Canton; Craig A. Moore, Ypsilanti, both of Mich.

[73] Assignee: Xycom, Inc., Saline, Mich.

[21] Appl. No.: 483,338

[22] Filed: Feb. 20, 1990

Related U.S. Application Data

[63] Continuation of Ser. No. 178,204, Apr. 6, 1988, abandoned.

[51] Int. Cl.⁵ .......................... G06F 1/00; H05K 7/16
[52] U.S. Cl. ..................................... 364/708; 361/391
[58] Field of Search ........ 364/708; 361/380, 390–393, 361/394

[56] References Cited

U.S. PATENT DOCUMENTS

| | | | |
|---|---|---|---|
| 2,871,457 | 1/1959 | Jencks et al. | 361/391 |
| 3,708,618 | 1/1973 | Hofmeister et al. | 361/390 |
| 3,848,953 | 11/1974 | Petroschanoff | 361/391 |
| 4,084,250 | 4/1978 | Albertine et al. | 364/708 |
| 4,236,190 | 11/1980 | Hollingsead et al. | 361/391 |
| 4,384,368 | 5/1983 | Rosenfeldt et al. | 361/392 |
| 4,388,671 | 6/1983 | Hall et al. | 361/391 |
| 4,479,198 | 10/1984 | Romano et al. | 364/900 |
| 4,493,524 | 1/1985 | Kaplan et al. | 339/125 R |
| 4,669,053 | 5/1986 | Krenz | 364/708 |
| 4,688,131 | 8/1987 | Noda et al. | 361/391 |
| 4,715,385 | 12/1987 | Cudahy et al. | 364/708 |
| 4,716,722 | 1/1988 | Rambach | 361/391 |
| 4,717,982 | 1/1988 | Toreson et al. | 364/708 |

FOREIGN PATENT DOCUMENTS 0087788 9/1983 European Pat. Off. ............ 361/392

Primary Examiner—Dale M. Shaw
Attorney, Agent, or Firm—Harness, Dickey & Pierce

[57] ABSTRACT

An industrial computer system comprising a video monitor, a plurality of computer cards, a pair of disk drive units, and power supply circuitry contained within a single cabinet. The computer cards, disk drives, and power supply circuitry are mounted in a drawer assembly that is readily removeable from the rear of the cabinet. Locator pins are affixed to the front end of the drawer assembly and are adapted to automatically engage a pair of holes located toward the front of the cabinet as the drawer is inserted into the cabinet. When inserted, the rear of the drawer assembly is bolted to the backpanel of the cabinet. Electrical connections between the components in the drawer assembly and the system are also made automatically as the drawer is inserted into the cabinet.

18 Claims, 2 Drawing Sheets

INDUSTRIAL COMPUTER SYSTEM WITH REMOVABLE EQUIPMENT DRAWER

This is a continuation of U.S. patent application Ser. No. 178,204, filed Apr. 6, 1988 now abandoned.

BACKGROUND AND SUMMARY OF THE INVENTION

The present invention relates to industrial computer systems and in particular to an industrial computer system having a removeable equipment drawer for providing ready accessibility to all major system components, except for the monitor.

Industrial computer systems to which the present invention relates, are specially designed and constructed to operate in harsh environments, such as on the plant floors of manufacturing facilities. Typical applications include controlling, reporting, and monitoring of the activities of plant floor production and process equipment. To operate in such real world manufacturing environments, industrial computer systems must meet special environmental specifications relating to temperature, shock, vibration, humidity, and voltage isolation. In order to meet such specifications, all of the components of a conventional computer system (except for the keyboard) are typically integrally packaged in a single enclosure. In other words, the video monitor, printed circuit boards, disk drives, power supply, backplanes, cabling, etc. are all located in a single enclosure. Packaging of this type, however, tends to compromise the serviceability of the product. In particular, the integral packaging configuration of a typical industrial computer makes accessibility to components difficult and inconvenient, especially when the unit is mounted in a rack containing a plurality of units or panel mounted in a sealed enclosure, which are common industry installation configurations. Under such circumstances, the performance of routine tasks such as the replacement of faulty components, the addition or upgrading of computer cards, or the altering of switch settings on a card, becomes relatively time consuming, which can be particularly disadvantageous when the operation of a manufacturing process is jeopardized or interrupted during such downtime.

Accordingly, it is the primary object of the present invention to provide an improved industrial computer system that satisfies all of the special environmental specifications required for operation on a plant floor, and yet provides convenient serviceability.

In addition, it is an object of the present invention to provide an improved industrial computer system that is integrally packaged in a single unit and includes a readily accessible and removeable equipment drawer that contains all of the major service components of the unit.

It is a further object of the present invention to provide an improved industrial computer system having an equipment drawer containing the computer cards, disk drives, and power supply for the unit, thereby eliminating the need for lengthy cables and avoiding potential connection problems.

It is also an object of the present invention to provide an improved industrial computer system having an equipment drawer that is automatically electrically connected when fully inserted into the unit.

Finally, it is an object of the present invention to provide an improved industrial computer system having an equipment drawer that is easily and quickly replaceable so that a faulty unit can be serviced off-line, thereby minimizing the downtime of the unit.

Additional objects and advantages of the present invention will become apparent from a reading of the following detailed description of the preferred embodiment which makes reference to the drawings in which:

DETAILED DESCRIPTION OF THE PREFERRED EMBODIMENT

Figure 1:
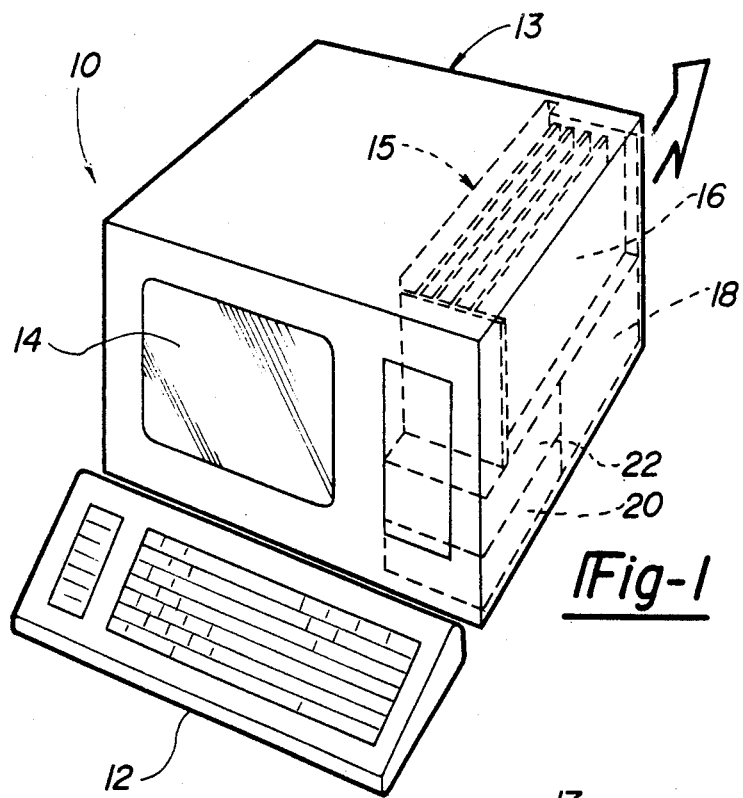
FIG. 1 is a perspective view of an industrial computer system according to the present invention.

Referring to FIG. 1, a perspective view of an industrial computer system incorporating the teachings of the present invention is shown. An industrial computer system suitable for use in a manufacturing environment is typically integrally packaged within a single enclosure due to the stringent specifications relating to temperature, shock, vibration, and humidity, which such equipment must satisfy. The computer system according to the present invention is generally configured in this manner and includes a single cabinet that contains a video monitor 14, a plurality of printed circuit boards or computer cards 16, a floppy disk drive 20, a hard disk drive 22, and a power supply circuit 18. Optionally, a keyboard 12 may also be included which connects to the unit 10 via a sealed keyboard connector located on the rear panel of the unit.

Figure 2:
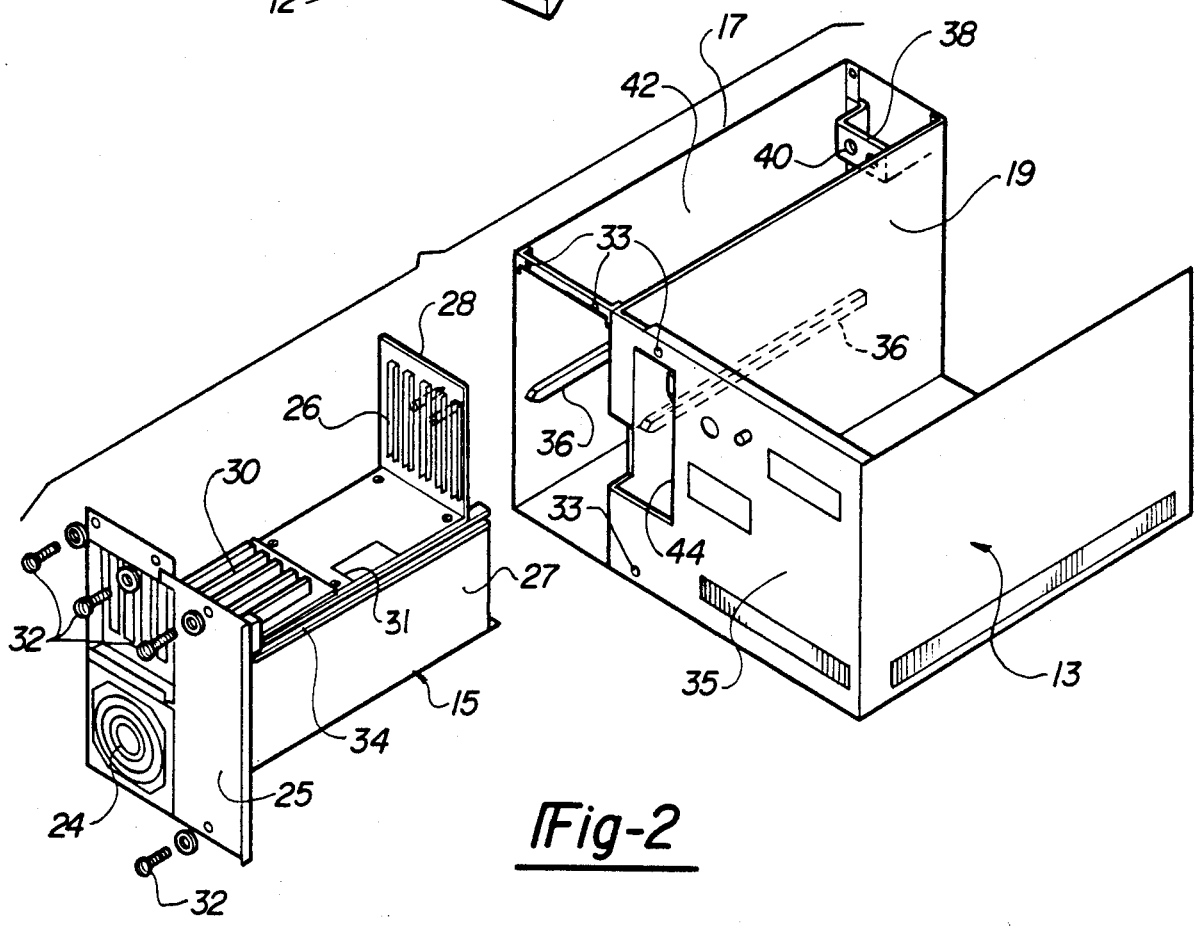
FIG. 2 is a partially disassembled perspective view of the industrial computer system according to FIG. 1 with the equipment drawer removed.
Figure 3:
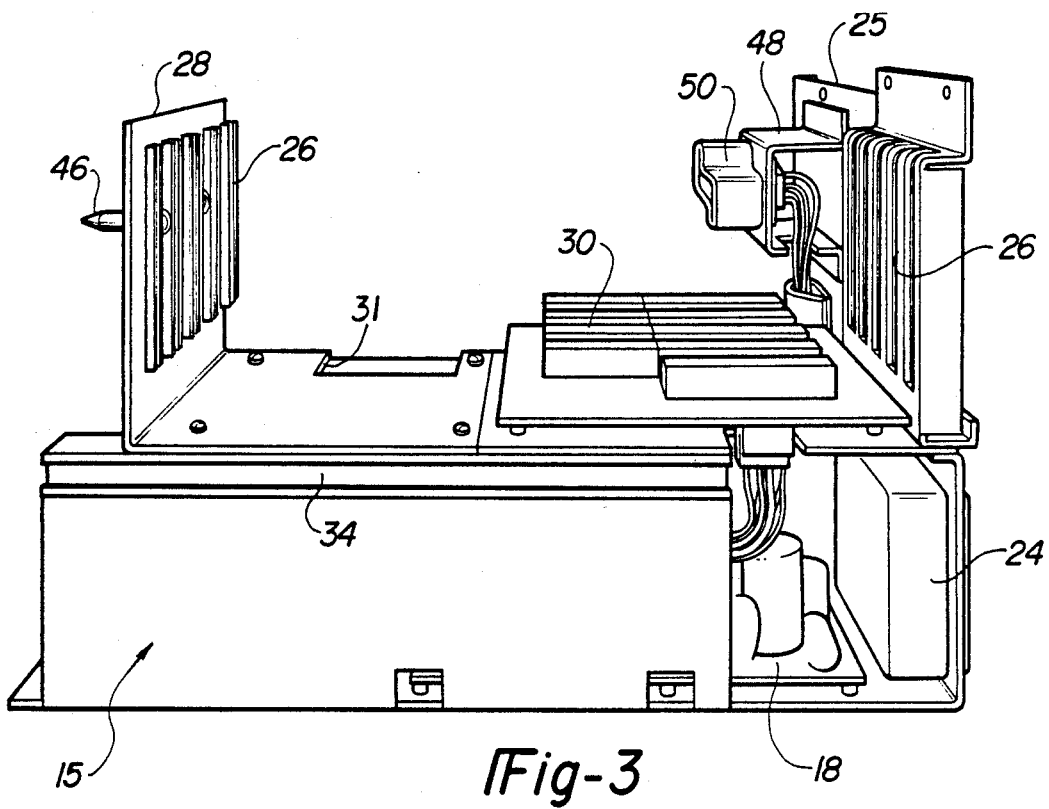
FIG. 3 is a side perspective view of the equipment drawer shown in FIG. 2.

The computer system 10 according to the present invention incorporates the computer cards 16, the power supply circuitry 18, and the disk drives 20 and 22, in an equipment drawer 15 that is readily removeable from the rear of the cabinet 13, as designated by the arrow shown in FIG. 1. With particular reference to FIGS. 2 and 3, perspective views of the equipment drawer 15 removed from the cabinet 13 are shown. In both FIGS. 2 and 3 the computer cards 16 have been removed for clarity. The equipment drawer 15 comprises an elongated box-like enclosure 27 that contains the disk drive units 20 and 22 toward the forward end of the enclosure for access from the front panel of the system, and the power supply circuitry 18 toward the rear of the enclosure. Mounted atop the enclosure 27 toward the front end of the drawer 15 is an L-shaped bracket 28 that supports a plurality of vertically oriented card slots or backplane 26. A similar set of card slots or backplane is oppositely located on the inside surface of the back panel 25 of the equipment drawer 15. The equipment drawer 15 in the preferred embodiment is adapted to receive up to five computer cards which are installed vertically in the backplanes 26 and inserted into edge connectors 30. An opening 31 in the top of the enclosure 27 provides a passageway for the ribbon cables connected between the disk drives and the computer cards.

The equipment drawer 15 is adapted to be slidably inserted through an opening in the rear panel 35 of the cabinet 13, into a compartment 42 defined by the side wall 17 of cabinet 13 and an inner partition wall 19 located parallel to sidewall 17. To aid in properly positioning the drawer 15, a pair of longitudinal rectangular-shaped channels 34 are provided along either side of the drawer 15. Preferably, these channels are located along the top edges of the enclosure 27 so as to place them approximately at the mid-height position on the drawer 15. The channels 34 are adapted to register with and receive correspondingly configured side rails 36 located on the inside surfaces of sidewall 17 and partition wall 19. In the preferred embodiment, the tracks 34 and rails 36 are made from an acetal-type synthetic resin material manufactured and sold by DuPont under the brand name "Delrin", which was selected for its durability and high lubricity.

Figure 4:
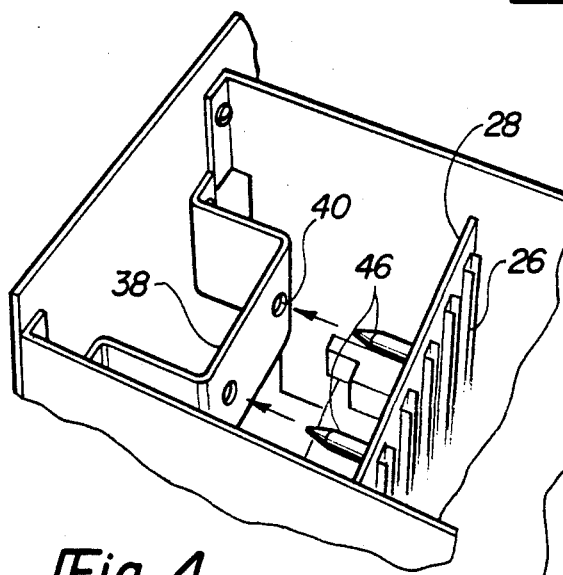
FIG. 4 is an enlarged view illustrating the registration of the locator pins on the equipment drawer with the holes in the front mounting bracket of the cabinet as the equipment drawer is inserted into the unit.

During development of the present computer system, it was determined that the tracks 34 and side rails 36 alone provide insufficient support for the drawer assembly 15 for the unit 10 to meet the required shock and vibration specifications. Accordingly, the present invention provides additional support means which is automatically engaged when the drawer 15 is inserted into the cabinet 13. In particular, mounted to the vertical portion of L-shaped bracket 28 is a pair of locator pins 46 approximately one inch in length. The locator pins 46 are bolted to bracket 28 so that they project in a direction normal to the bracket 28 toward the front of the drawer 15, as best shown in FIG. 4. As the drawer 15 is slidably inserted into compartment 42, the locator pins 46 are adapted to engage a corresponding pair of holes 40 formed in a U-shaped bracket 38 mounted at the front of the drawer compartment 42. Preferably, a pair of grommets (not shown) are inserted in the holes 40 so as to provide a tight fit with the locator pins 46.

The inclusion of the locator pins 46 on the drawer assembly 15 and their registration with the holes 40 in the cabinet-mounted bracket 38 serve to rigidly secure the front end of the drawer assembly 15 when installed in the cabinet 13. In addition, once the drawer 15 is fully inserted into the cabinet 13, the rear panel 25 of the drawer assembly 15 is bolted with four bolts 32 to four threaded holes 33 in the rear panel 35 of the cabinet 13. In this manner, it will be appreciated that the drawer assembly 15 when installed is rigidly secured at its forward end to the front of the cabinet 13 by the locator pins 46 and at its rearward end by the bolted connection directly to the cabinet 13. Furthermore, the inclusion of the tracks 34 and rails 36 also serves to provide additional support along the length of the drawer 15.

Figure 5:
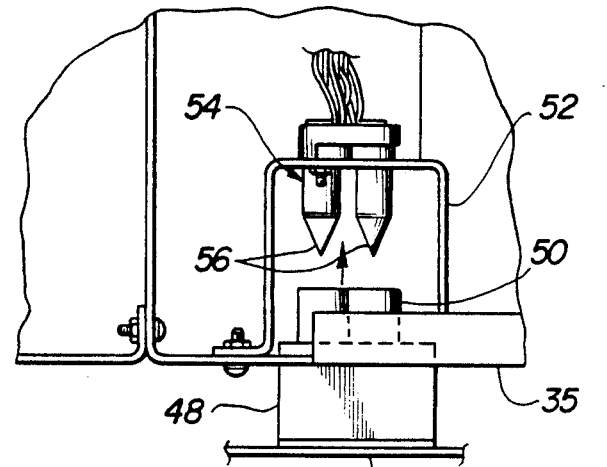
FIG. 5 is an enlarged view illustrating the registration of the male and female halves of the electrical connector that is connected together as the equipment drawer is inserted into the unit.

Referring now to FIGS. 3 and 5, the automatic power connection feature of the present invention is shown. In particular, when the equipment drawer 15 is fully inserted into the computer 42 of the cabinet 13, the power connections to the components in the equipment drawer and the connections from the computer cards to the external keyboard connector are automatically completed. As best shown in FIG. 3, the rear panel 25 of the drawer assembly 15 has mounted on its inside surface a U-shaped bracket 48 which in turn has mounted thereto a 12-pin female connector system 50. The pins are connected to various power circuit lines, including a.c. and d.c., as well as data and clock keyboard lines. A second U-shaped bracket 52 is mounted to the back panel of the cabinet 13 so as to span the adjacent opening 44 in the rear panel 35 of the cabinet. The corresponding male half of the electrical power connector 54 is mounted to the bracket 52 in such a manner as to permit the male connector portion 54 to "float" relative to the bracket 52. In addition, the male connector portion 54 includes a pair of alignment pins 56 that are adapted to fit within corresponding recesses formed in the female connector half 50, thus assuring proper registration between the two connector halves. In the preferred embodiment, the power connector utilized is manufactured by the Amp Corporation under the part designations 211758-1 and 211759-1. This connector, with the floating mount feature of the male connector, can accommodate a misalignment in any direction of 0.090 inches between the two connector halves and still provide a proper electrical connection as the connector halves are brought together. To help insure that the male and female connector halves 54 and 50 are within the required 0.090 inch tolerance range when joined, the locator pins 46 mounted at the front of drawer 15 are designed to engage the holes 40 in the mounting bracket 38 prior to engagement of the connector halves as the drawer assembly 15 is inserted into the cabinet 13.

Lastly, it will be noted that a cooling fan 24 is located on the lower rear panel 25 of the drawer 15 for drawing ambient air into the enclosure 27. When the equipment drawer 15 is installed in the cabinet 13 of the unit 10, cooling air drawn in by the fan 24 passes over the power supply circuitry 18, the disk drive units 20 and 22, then upwardly and through elongated holes (not shown) located between the card slots 26 on the L-shaped bracket 28, along the length of the computer cards 16, and out through vents located in the top of the cabinet 13 toward the rear of the unit. The efficiency of the present cooling design is such that the maximum temperature rise in the air exiting the unit relative to the ambient temperature is limited to 7° C.

Thus, it will be appreciated that the industrial computer system disclosed herein is suitably designed to provide easy serviceability for the high-maintenance items of the computer system. In addition, the removeable drawer assembly makes it extremely convenient to replace, upgrade, and/or alter switch positions on the computer cards. Moreover, the automatic electrical connection feature of the present invention, which is made possible by the inclusion of the power supply and disk drives within the equipment drawer, permits the entire drawer assembly to be readily replaced for off-line servicing.

In addition, as will be appreciated by those skilled in the art, the design of the present industrial computer system allows the unit to be serviced without requiring removal of the system from a multiple rack or panel mount installation. In other words, because the present invention does not require that the cabinet be disassembled to provide access to its major components, as is required with conventional designs, the unit can be left in the rack or left mounted to the sealed front panel while it is serviced. Finally, it will be appreciated that the present invention provides easy serviceability without compromising the ruggedness of the system.

While the above description comprises the preferred embodiment, it will be appreciated that the present invention is subject to modification and change without departing from the proper meaning and fair scope and accompanying claims.

What is claimed is:

1. An industrial computer system comprising a video monitor, a plurality of computer cards, a disk drive, and power supply circuitry, all contained within a single cabinet, and further including:
- a removable drawer assembly having a forward end and a rearward end, that can be removed from and inserted into a compartment within said cabinet by sliding said drawer assembly along a first axis, said drawer assembly containing one or more of said plurality of computer cards, said disk drive, and/or said power supply circuitry;
- guide means for guiding and positioning said drawer assembly as it is inserted along said first axis into said compartment within said cabinet;
- locator means separate from said guide means which is engaged as said drawer assembly is fully inserted along said first axis into said compartment, said locator means aligning and supporting the forward end of said drawer assembly therein;
- electrical connector means which is engaged as said drawer assembly is fully inserted along said first axis into said compartment for automatically making electrical connections to the components in said drawer assembly; and
- fastening means for securing the rearward end of said drawer assembly to said cabinet once said drawer assembly is fully inserted therein.

2. The computer system of claim 1 wherein said drawer assembly slides out of the back of said cabinet.

3. The computer system of claim 2 wherein said locator means engages prior to said electrical connector means as said drawer assembly is inserted along said first axis into said compartment of said cabinet.

4. The computer system of claim 1 further including fan means mounted at the rearward end of said drawer assembly for drawing ambient air through said compartment in said cabinet.

5. An industrial computer system comprising a video monitor, a plurality of computer cards, a disk drive, and power supply circuitry, all contained within a single cabinet, said cabinet having a first compartment containing said video monitor and a second compartment containing a removable drawer assembly that can be removed from and inserted into said second compartment by sliding said drawer assembly along a first axis; said drawer assembly comprising a generally rectangular-shaped enclosure containing said disk drive at its forward end and said power supply circuitry at its rearward end, and card mounting means including a plurality of edge connectors for mounting said plurality of computer cards on top of said enclosure; and further including means for positioning and guiding said drawer assembly on said first axis; locator means separate from said means for positioning and guiding, automatically engaging the forward end of said drawer assembly with the forward portion of said second compartment as said drawer assembly is inserted along said first axis into said second compartment, said locator means rigidly supporting the forward end of said drawer assembly and mechanical fastening means for rigidly securing the rearward portion of said drawer assembly to the rear of said cabinet.

6. The computer system of claim 5 wherein said locator means comprises a pair of pins mounted to the front of said drawer assembly and a corresponding pair of holes in a part rigidly mounted to said cabinet toward the front of said second compartment.

7. The computer system of claim 5 wherein said drawer assembly is removed from the rear of said cabinet.

8. The computer system of claim 7 wherein said positioning and guiding means comprises rail means mounted to said drawer assembly and to the walls of said second compartment for guiding and positioning said drawer assembly as it is inserted into said second compartment.

9. The computer system of claim 5 further including fan means mounted on the rear face of said enclosure for drawing ambient air into said enclosure over said power supply circuitry and said disk drive.

10. The computer system of claim 5 further including electrical connector means mounted to said drawer assembly and to said cabinet which is automatically engaged as said drawer assembly is inserted along said first axis into said second compartment to electrically connect the components in said drawer assembly to said system.

11. The computer system of claim 10 wherein said locator means engages as said drawer assembly is inserted along said first axis into said second compartment before engagement of said electrical connector means.

12. An industrial computer system comprising a video monitor, a plurality of computer cards, a disk drive, and power supply circuitry, all contained within a single cabinet, and further including:
- a removable drawer assembly holding at least one of said computer cards, disk drive or power supply circuitry, said drawer assembly removable in a compartment of said cabinet along a first axis;
- guide means located on opposite sides of said drawer assembly for guiding said drawer assembly as it is inserted along said first axis into said compartment;
- locator means separate from said guide means which is engaged as said drawer assembly is fully inserted along said first axis into said compartment, said locator means aligning and supporting the forward end of said drawer assembly therein and constraining movement of the forward end of said drawer assembly along second and third orthogonal axes mutually orthogonal to said first axis;
- electrical connector means which is engaged as said drawer assembly is fully inserted along said first axis into said compartment for automatically making electrical connections to the components in said drawer assembly; and
- fastening means for rigidly securing the rearward end of said drawer assembly to said cabinet once said drawer assembly is fully inserted therein thereby constraining further movement of said drawer assembly along said first axis.

13. A computer system comprising a video monitor, a plurality of computer cards, a disk drive, and a power supply all contained within a single cabinet having a plurality of sides, said system further comprising:
- a first compartment within said cabinet, said first compartment housing said video monitor and a first electrical connector that is positioned adjacent a first opening in one of the sides of said cabinet;
- a second compartment adjacent said first compartment and separated by a wall therebetween, said second compartment containing aligned rails, one of said rails positioned on said wall separating said first and second compartments and another rail positioned on an opposite wall; and a removable drawer assembly including a back panel and two side panels and a second electrical connector and at least one of said plurality of computer cards, disk drive, or power supply;

wherein said drawer assembly is removable through a second opening in said one side along said rails in said second compartment by means of grooves along said two side panels, and further wherein said second electrical connector is positioned on said drawer assembly such that said second electrical connector is electrically connected to said first electrical connector when said drawer assembly is fully positioned within said cabinet.

14. The computer system of claim 13 wherein said second electrical connector is positioned on said back panel of said drawer assembly.

15. The computer system of claim 13 wherein said drawer assembly further includes a fan, said fan positioned on said back panel.

16. The computer system of claim 13 wherein said drawer assembly further includes fastening means for securing said drawer assembly within said second compartment, said fastening means positioned on said back panel.

17. The computer system of claim 13 wherein said one side of said cabinet comprises a back plate, said back plate defining said first and second openings to said first and second compartments, said back panel of said drawer assembly completely covering said separate openings when said drawer assembly is fully positioned within said cabinet.

18. The computer system of claim 13 further comprising registry means for automatically rigidly securing said drawer assembly to a side of the cabinet opposite said one side when said drawer assembly is fully positioned within said cabinet.

* * * * *